United States Patent [19]

Raddatz

[11] 4,333,624

[45] Jun. 8, 1982

[54] HANGER ASSEMBLY

[75] Inventor: John A. Raddatz, South St. Paul, Minn.

[73] Assignee: Minnesota Mining and Manufacturing Company, St. Paul, Minn.

[21] Appl. No.: 85,043

[22] Filed: Oct. 15, 1979

[51] Int. Cl.³ .............................................. F16M 13/00
[52] U.S. Cl. ................................................ 248/205 R
[58] Field of Search ............... 248/60, 73, 74 PB, 102, 248/205 R, 222.2, 222.3, 317; 24/3 M, 16 PB

[56] References Cited

U.S. PATENT DOCUMENTS

| | | | |
|---|---|---|---|
| 1,086,442 | 2/1914 | Cornelius | 248/60 X |
| 2,937,834 | 5/1960 | Orenick et al. | 248/74 PB |
| 3,043,547 | 7/1962 | Reich | 248/317 |
| 3,979,094 | 9/1976 | De Witt | 248/74 PB |

FOREIGN PATENT DOCUMENTS

| | | | |
|---|---|---|---|
| 428223 | 6/1911 | France | 248/317 |
| 360840 | 4/1962 | Switzerland | 24/16 PB |
| 875935 | 8/1961 | United Kingdom | 248/73 |

Primary Examiner—William H. Schultz
Attorney, Agent, or Firm—Cruzan Alexander; Donald M. Sell; William L. Huebsch

[57] ABSTRACT

A hanger assembly comprising a strap having a plurality of rectangular openings spaced along its length; and a rigid locking member having an elongate flange portion adapted to be moved through two or more openings in the strap placed adjacent each other and then positioned transverse of the openings to lock together the portions of the strap around the openings to form one or more loops in the strap.

11 Claims, 7 Drawing Figures

HANGER ASSEMBLY

BACKGROUND OF THE INVENTION

This application relates to hanger assemblies adapted for binding or hanging objects, which hanger assemblies include a length of strap and one or more locking members for releasably attaching portions of the strap together.

Many such hanger assemblies are known which include a length of stiff, flexible strap having a plurality of through openings along its length, and a locking member adapted to be inserted through two or more of the openings to join portions of the strap together and thereby form loops in the strap. Such loops can either form ties to hold objects together, or provide a means by which objects may be hung from a support or conveniently carried.

In one such known prior art hanger assembly the locking member included spaced button-like portions mounted at opposite ends of a shaft; and the spaced openings in the strap include major opening portions of sufficient diameter to pass one of the button-like portions through the strap, and a slot portion extending in one or both directions along the strap from the major opening portion which slot portion will not pass the button-like portions. The strap may be formed into a loop (either around an object or objects or in space), two of the openings on opposite ends of the loop can be placed opposite each other, one button-like portion of the locking member can be inserted through the opposite major opening portions of the opposite openings, and the shaft between the button-like portions can be slid into the slot portions of the opposite openings so that the button-like portions are adjacent the outer surfaces of the strap portions to hold the strap portions together. By this method one, two, or more loops may be formed with the strap to afford binding objects together, hanging an object or objects from a support, or providing a handle to conveniently carry bound objects.

Another such known prior art hanger assembly uses a locking member like that described above; however, the strap is of elastic material, the openings are circular and have about the same diameter as the shaft of the locking member, and the button-like portions of the locking member are moved through the openings by elastically deforming the strap material around the opening.

Neither of these hanger assemblies provides as strong and positive an engagement between the locking member and the strap as may be desired for some applications, however, because of the possibility that forces applied to the strap can, in the case of the stiff, flexible strap, cause the locking member to bend generally triangular portions of the strap between the major opening and slot portions of the openings and thereby allow the button-like portions to escape; or, in the case of the elastic strap, that forces applied to the strap can enlarge the openings and allow the button-like portions to escape.

SUMMARY OF THE INVENTION

According to the present invention there is provided a hanger assembly generally of the type described above, but which provides engagement between a locking member and a strap that will not be released by tensile forces on the strap.

According to the present invention there is provided a stiff, flexible, resilient polymeric strap having a plurality of through openings spaced along its length, with each of the openings being partially defined by opposed, generally parallel side surfaces defining the longest dimension and maximum width of the opening, which side surfaces are disposed generally parallel to and equally spaced from the adjacent edges of the strap. Also included is a rigid locking member comprising (1) a backing plate portion sized to prevent its movement through the openings, (2) a post portion projecting from the backing and adapted for movement through the opening, and (3) an elongate flange portion transverse of and centrally affixed on the end of the post portion opposite the backing plate portion. The flange portion is shaped so that it can pass through one of the openings when its long sides are aligned along the strap, but cannot pass through the opening when its long sides are positioned transverse of the strap. To couple portions of the strap together a user can align openings along the portions, insert the flange and post portions through the openings, and rotate the locking member so that the flange portion is transverse of the openings and strap portions, whereupon the locking member cannot be withdrawn from the openings.

The locking member may have an orifice through its flange, post and backing plate portions through which orifice a nail or screw may be inserted from the flange portion end to attach the locking member to a support (such as a stud in a garage wall). The locking member when thus attached in a fixed position with the flange portion horizontal will receive portions of the strap which are also horizontally positioned as the portions of the strap around two of its openings are placed over the flange portion, whereupon the strap can be moved to a vertical position (where it will be retained by the weight of any objects held by the strap) so that the flange portion will extend transverse of the openings and surrounding strap portions and hold the strap in place on the locking member.

The post portion of the locking member may have opposed side walls adapted to fit closely between the side surfaces of the openings and aligned so that the flange portion will be detented in a position transverse of the opening, which is useful to prevent the locking member from inadvertently being rotated to a position with the flange portion aligned with the openings. Also the post portion may have other such opposed side walls aligned to detent the flange portion in a position disposed at about 45 degrees to the openings which may be desirable for forming loops in which the adjacent openings through which the locking member is engaged cross each other at an angle of about 90 degrees and a portion of the loop formed projects generally perpendicular to the backing plate portion of the locking member to conveniently receive an object dropped vertically into it.

BRIEF DESCRIPTION OF THE DRAWING

The present invention will be more thoroughly explained with reference to the accompanying drawing where like numbers refer to like parts in the several views, and wherein.

DESCRIPTION OF THE PREFERRED EMBODIMENT

Figure 2:
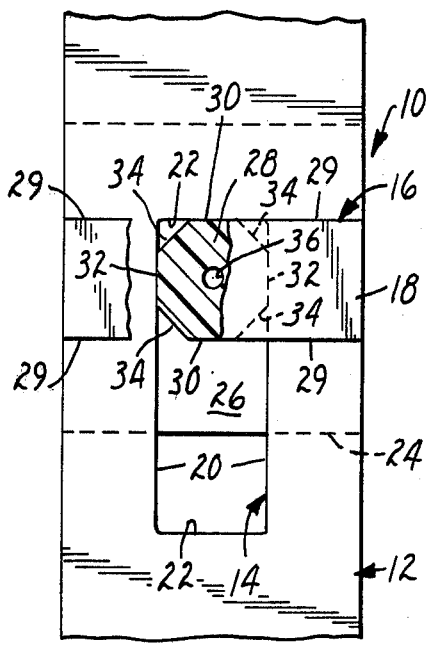
FIG. 2 is an enlarged fragmentary front view partially in section of the assembled hanger assembly of FIG. 1.
Figure 3:
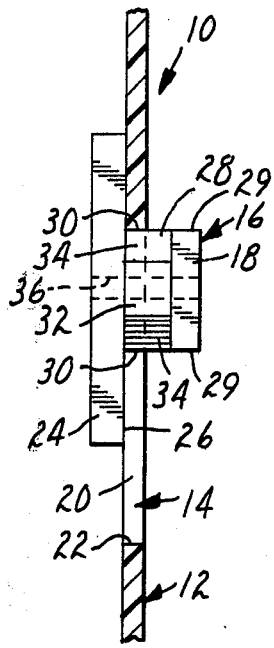
FIG. 3 is an enlarged fragmentary sectional view of the hanger assembly of FIG. 1, but shown with only one portion of a strap on a locking member of the hanger assembly.

Referring now to the drawing, there is shown in FIGS. 1 through 5 a hanger assembly according to the present invention generally designated by the reference numeral 10, which hanger assembly 10 comprises (1) a strap 12 having a plurality of through, generally rectangular openings 14 spaced along its length; and (2) a separate rigid locking member 16 having an elongate flange portion 18 adapted to be moved through two or more openings 14 in the strap 12 placed adjacent each other and then positioned transverse of the openings (either by rotating the strap 12 relative to the locking member 16 or rotating the locking member 16 relative to the strap 12) to lock together the portions of the strap 12 around the openings 14 to form one or more loops in the strap 12.

The strap 12 is of a stiff, flexible, resilient material which may be polymeric (e.g., polypropylene). The openings 14 are each defined by opposed, generally parallel side surfaces 20 defining the longest dimension and maximum width of the opening 14, which side surfaces 20 are disposed generally parallel to and equally spaced from the adjacent edges of the strap 12; and by opposed generally parallel end surfaces 22 disposed perpendicular to the edges of the strap 12.

The locking member 16 is an integral construction, including (1) a generally square plate-like backing plate portion 24 having width and length dimensions along a front surface 26 precluding the movement of the backing plate portion through one of the openings 14 in a direction normal to the front surface 26; (2) a post portion 28 projecting from the backing plate portion 24 normal to the front surface 26 and being adapted to be received between the side surfaces 20 of the openings 14; and (3) the elongate flange portion 18 transverse of and affixed at its center on the end of the post portion 28 opposite the backing plate portion 24. The flange portion 18 has a width and length parallel to the front surface 26 of the backing plate portion 24 adapted so that the flange portion 18 can pass freely through one of the openings 14 when its long side surfaces 29 are aligned with the side surfaces 20 of the opening 14, with the length of the flange portion 18 being adapted to prevent movement of the flange portion 18 through one of the openings 14 when the flange portion 18 is disposed transverse of that opening 14.

Figure 5:
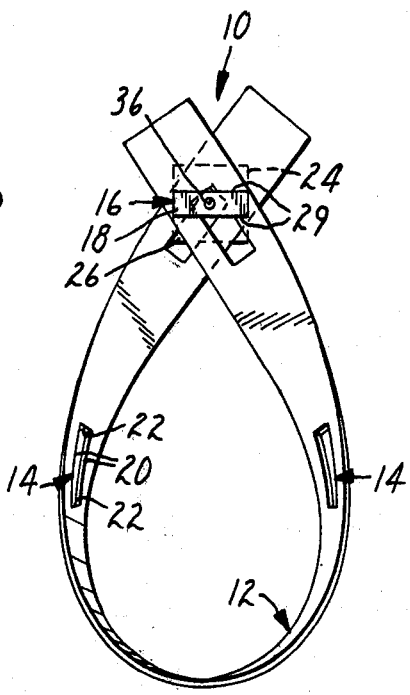
FIG. 5 is a front view of the hanger assembly of FIG. 1 but shown with the locking member latching portions of a strap at right angles to each other to form a loop.

The post portion 28 has an octagonal cross section and four pairs of opposite side surfaces projecting perpendicular to the front surface 26. As seen in FIG. 2, these pairs of side surfaces include a first pair of side surfaces 30 disposed parallel to the long side surfaces 29 of the flange portion 18, a second pair of side surfaces 32 disposed perpendicular to the long side surfaces 29 of the flange portion 18, and third and fourth pairs of side surfaces 34 disposed at an angle of about 45 degrees with respect to the long side surfaces 29 of the flange portion 18. Each pair of opposed side surfaces 30, 32, 34 is adapted to fit closely between the side surfaces 20 of any one of the openings 14 so that the flange portion 18 will be releasably retained or detented in positions aligned with, disposed at 45 degrees with respect to, or transverse of the openings 14 in which the post portion 28 is positioned, since relative rotation of the flange portion 18 and strap 12 between these positions requires that the portions of the strap 12 adjacent the post portion 28 be deflected. Such detenting of the locking member 16 with respect to the strap 12 is helpful to restrict inadvertent rotation of the flange portion 18 out of its position transverse of the strap 12; and to help maintain the flange position 18 in alignment with the openings 14 in the strap 12 as the flange and post portions 18 and 28 are inserted into or removed from the openings 14. Additionally the detenting of the flange portion 18 at positions disposed at 45 degrees with respect to the openings 14 allows two portions of the strap 12 around openings 14 to be engaged over the locking member 16 as shown in FIG. 5 with the strap portions disposed at right angles to each other and having their common surfaces facing the same direction so that a portion of the loop thus formed projects generally perpendicularly away from the backing plate portion 24 where it will receive and hold objects, such as hammers, dropped vertically into the loop.

The locking member 16 also has an orifice 36 through all of its portions 18, 28, and 24 coaxial with the post portion 28, which orifice 36 is adapted to receive a fastener such as a nail or screw inserted from the end at the flange portion 18 to fasten the locking member 16 to a support (such as a stud in a garage). Such fastening can fix the locking member 16 against the support member with the long side surfaces 29 of the flange portion 18 horizontal so that the strap 12 is then positioned horizontal as its portions around one of the openings 14 therein are engaged over the flange portion 18; or alternatively, can allow rotation of the locking member 16 on the fastener so that the long side surfaces 29 of the flange portion 18 can be disposed vertically to allow engagement of the strap 12 when the strap 12 is in a vertical position, and can then be rotated to position the long side surfaces 19 of the flange portion 18 horizontal to lock the strap 12 on the locking member 16.

Figure 6:
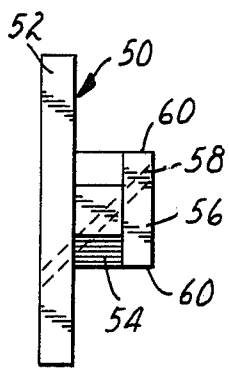
FIG. 6 is a side view of a second embodiment of a locking member for use in the hanger assembly of FIG. 1.

FIG. 6 shows an alternate embodiment of a locking member 50 according to the present invention, which locking member 50 includes a backing plate portion 52, a post portion 54, and a flange portion 56 shaped like the corresponding portions of the locking member 16, but which locking member 50, unlike the locking member 16, has an orifice 58 which passes through all of its portions 52, 54 and 56 at an acute angle with respect to the post portion 54 and in a plane transverse to the long side surfaces 60 of the flange portion 56. Such an inclined orifice 58 allows a fastener attaching the locking member 50 to a support to enter at a downwardly inclined angle which may provide greater resistance to pull out of the fastener under a vertical load than does the orientation of the orifice 36 in the locking member 16.

Figure 7:
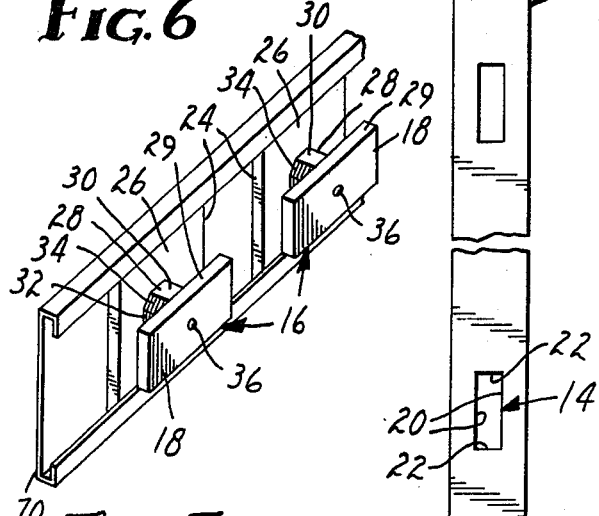
FIG. 7 is a perspective view of a slide shown supporting locking members included in the hanger assembly according to the present invention.
Figure 4:
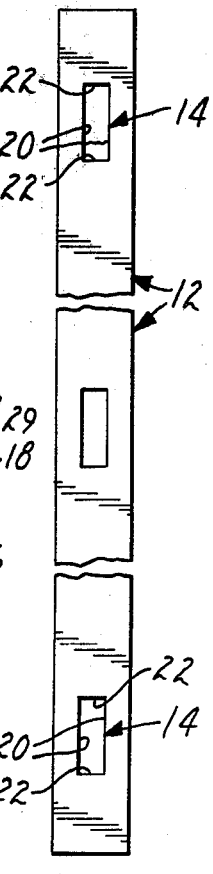
FIG. 4 is a fragmentary view of the strap included in the hanger assembly shown in FIG. 1.
Figure 1:
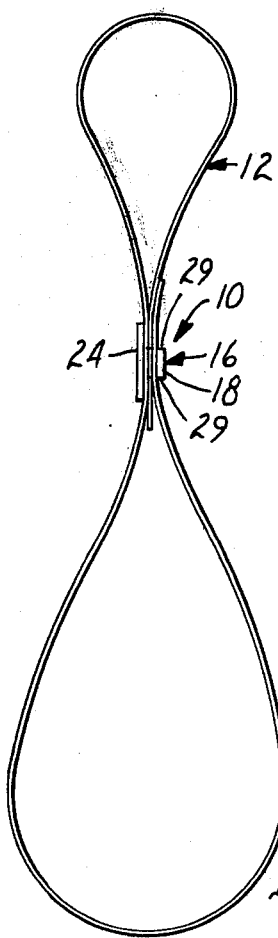
FIG. 1 is a side view of a hanger assembly according to the present invention.

FIG. 7 illustrates an elongate generally C-shaped channel 70 of a strong material (e.g., aluminum) that defines a track in which a plurality of the locking members 16 could be supported via their backing plates 24. Such a channel 70 might be useful, for example, attached horizontally between two studs in a garage so that a plurality of the locking members 70 in the track could be slid to desired spacings to support one or more objects from straps 12 attached to the locking members 70.

I claim:

1. A hanger assembly comprising:
   a stiff, flexible, resilient polymeric strap having a plurality of through openings spaced along its length, each of said openings being partially defined by opposed, generally parallel side surfaces defining the longest dimension and width of said opening, said side surfaces being disposed generally parallel to and equally spaced from the adjacent edges of said strap; and
   a rigid locking member comprising:
     a backing plate portion having length and width dimensions along a front surface precluding the movement of said backing plate portion through one of said openings in a direction normal to said front surface;
     a post portion projecting from said backing plate normal to said front surface and being adapted to be received between the side surfaces of said openings; and
     an elongate flange portion transverse of and centrally affixed on the end of said post portion opposite said backing plate portion, said flange portion having a width and a length parallel to said front surface adapted so that said flange portion can pass freely through one of said openings when the long side surfaces of said flange are aligned with the side surfaces of that opening, with said length of said flange portion being adapted to prevent movement of said flange portion through one of said openings when the long side surfaces of said flange portion are disposed transverse of said opening;
   said locking member having an orifice through said backing plate, post and flange portions to afford attaching said locking member to a support.

2. A hanger assembly according to claim 1 wherein said post portion has two opposite side surfaces disposed generally normal to the long side surfaces of said elongate flange and adapted to fit closely between the side surfaces of said openings to detent said flange portion transverse of said openings.

3. A hanger assembly according to claim 2 wherein said post portion has two opposite side surfaces disposed at an angle of about 45 degrees with respect to the long side surfaces of said flange, and adapted to fit closely between the opposed side surfaces of any one of said openings to detent said flange portion in a position with its long side surfaces disposed at an angle of about 45 degrees with respect to the opposed side surfaces of said opening.

4. A hanger assembly according to claim 1 wherein said post portion has an octagonal cross section with four pairs of opposite side surfaces, with one of said pairs disposed generally normal to the long side surfaces of said flange, all of said pairs of opposite side surfaces being adapted to fit closely between the opposed side surfaces of any one of said openings to detent the long side surfaces of said flange portion either aligned with, perpendicular to, or at an angle of about 45 degrees with respect to the side surfaces of said opening.

5. A hanger assembly according to claim 1 wherein said orifice passes through said locking member coaxially with said post portion.

6. A hanger assembly acording to claim 1 wherein said orifice passes through said locking member at an acute angle with respect to the central axis of said post portion and in a plane transverse of the long side surfaces of said flange portion.

7. A hanger assembly comprising:
   a stiff, flexible, resilient polymeric strap having a plurality of through openings spaced along its length, each of said openings being partially defined by opposed, generally parallel side surfaces defining the longest dimension and width of said opening, said side surfaces being disposed generally parallel to and equally spaced from the adjacent edges of said strap; and
   a rigid locking member comprising:
     a backing plate portion having length and width dimensions along a front surface precluding the movement of said backing plate portion through one of said openings in a direction normal to said front surface;
     a post portion projecting from said backing plate normal to said front surface and being adapted to be received between the side surfaces of said openings; and
     an elongate flange portion transverse of and centrally affixed on the end of said post portion opposite said backing plate portion, said flange portion having a width and a length parallel to said front surface adapted so that said flange portion can pass freely through one of said openings when the long side surfaces of said flange are aligned with the side surfaces of that opening, with said length of said flange portion being adapted to prevent movement of said flange portion through one of said openings when the long side surfaces of said flange portion are disposed transverse of said opening;
   said post portion having two opposite side surfaces disposed generally normal to the long side surfaces of said elongate flange and adapted to fit closely between the side surfaces of said openings to detent said flange portion transverse of said openings.

8. A hanger assembly comprising:
   a stiff, flexible, resilient polymeric strap having a plurality of through openings spaced along its length, each of said openings being partially defined by opposed, generally parallel side surfaces defining the longest dimension and width of said opening, said side surfaces being disposed generally parallel to and equally spaced from the adjacent edges of said strap; and
   a rigid locking member separate from said strap comprising:
     a backing plate portion having length and width dimensions along a front surface precluding the movement of said backing plate portion through one of said openings in a direction normal to said front surface;
     a post portion projection from said backing plate normal to said front surface and being adapted to be received between the side surfaces of said openings, said post portion having a length adapted to extend through the openings in at least two portions of said strap positioned adjacent such other; and an elongate flange portion transverse of and centrally affixed on the end of said post portion opposite said backing plate portion, said flange portion having a width and a length parallel to said front surface adapted so that said flange portion can pass freely through one of said openings when the long side surfaces of said flange are aligned with the side surfaces of that opening, with said length of said flange portion being adapted to prevent movement of said flange portion through one of said openings when the long side surfaces of said flange portion are disposed transverse of said opening.

9. A hanger assembly according to claim 8 wherein said post portion has two opposite side surfaces disposed generally normal to the long side surfaces of said elongate flange and adapted to fit closely between the side surfaces of said openings to detent said flange portion transverse of said openings.

10. A hanger assembly according to claim 9 or claim 7 wherein said post portion has two opposite side surfaces disposed at an angle of about 45 degrees with respect to the long side surfaces of said flange, and adapted to fit closely between the opposed side surfaces of any one of said openings to detent said flange portion in a position with its long side surfaces disposed at an angle of about 45 degrees with respect to the opposed side surfaces of said opening.

11. A hanger assembly according to claim 9 or claim 7 wherein said post portion has an octagonal cross section with four pairs of opposite side surfaces including said opposite side surfaces disposed generally normal to the long side surfaces of said flange, all of said pairs of opposite side surfaces being adapted to fit closely between the opposed side surfaces of any one of said openings to detent the long side surfaces of said flange portion either aligned with, perpendicular to, or at an angle of about 45 degrees with respect to the side surfaces of said opening.

* * * * *